United States Patent [19]
Takahashi et al.

[11] Patent Number: 5,972,452
[45] Date of Patent: Oct. 26, 1999

[54] SHEET SHAPED OXYGEN ABSORBING MEMBER AND METHOD FOR MANUFACTURE THEREOF

[75] Inventors: Hideyuki Takahashi; Hidetoshi Hatakeyama; Futoshi Nakaya, all of Tokyo, Japan

[73] Assignee: Mitsubishi Gas Chemical Company, Inc., Tokyo, Japan

[21] Appl. No.: 08/799,961

[22] Filed: Feb. 14, 1997

Related U.S. Application Data

[63] Continuation-in-part of application No. 08/354,099, Dec. 6, 1994, abandoned.

[30] Foreign Application Priority Data

Dec. 7, 1993 [JP] Japan ...................................... 5-306512

[51] Int. Cl.⁶ .................................................. C01B 13/00
[52] U.S. Cl. ...................... 428/40.1; 206/204; 206/484.1; 206/484.2; 252/188.28; 428/72; 428/76; 428/78; 428/213; 428/215
[58] Field of Search ................................ 428/40.1, 72, 76, 428/78, 213, 215; 252/188.28; 206/204, 484.1, 484.2

[56] References Cited

U.S. PATENT DOCUMENTS

| | | | |
|---|---|---|---|
| 5,116,660 | 5/1992 | Komatsu et al. ........................ | 428/198 |
| 5,143,769 | 9/1992 | Moriya et al. ............................. | 428/76 |
| 5,153,038 | 10/1992 | Koyama et al. ........................ | 428/35.8 |
| 5,157,902 | 10/1992 | Hatakeyama .............................. | 53/492 |
| 5,486,158 | 1/1996 | Samuelsen ................................ | 602/42 |

FOREIGN PATENT DOCUMENTS

| | | |
|---|---|---|
| 0225593 | 6/1987 | European Pat. Off. . |
| 0367390 | 5/1990 | European Pat. Off. . |
| 0466515 | 1/1992 | European Pat. Off. . |
| 0657277 | 6/1995 | European Pat. Off. . |
| 62-1824 | 1/1987 | Japan . |
| 06336816 | 6/1994 | Japan . |
| 06158832 | 7/1994 | Japan . |
| 9212004 | 7/1992 | WIPO . |
| 9425263 | 11/1994 | WIPO . |

*Primary Examiner*—Nasser Ahmad
*Attorney, Agent, or Firm*—Leydig, Voit & Mayer, Ltd.

[57] ABSTRACT

A sheet shaped oxygen absorbing member according to the present invention comprises a lamination in the order of a separator layer, a base layer having an adhesive layer, an oxygen absorbing layer and a gas permeable layer, the gas permeable layer being directly secured to the base layer at the periphery of the lamination, and is structured to be capable of attaching by readily peeling off from the separator layer.

20 Claims, 4 Drawing Sheets

SHEET SHAPED OXYGEN ABSORBING MEMBER AND METHOD FOR MANUFACTURE THEREOF

This is a continuation-in-part patent application of application Ser. No. 08/354,099, filed Dec. 6, 1994, now abandoned.

BACKGROUND OF THE INVENTION

1. Field of the Invention

The present invention relates to an oxygen absorbing member having an oxygen absorbing property and formed into a sheet like shape, and a method for manufacture thereof. The oxygen absorbing member can be used in the field of a container storing foodstuffs or pharmaceuticals. Oxygen existing in the container can be removed by securing this oxygen absorbing member in the container, and thus deterioration or oxidation of foodstuffs or pharmaceuticals can be prevented.

2. Description of Related Art

In order to maintain quality or freshness of foodstuffs or pharmaceuticals during their storage period, so-called oxygen absorbing packaging, wherein an oxygen absorbing agent is enclosed in the container together with articles to be stored, has been widely used for the purpose of absorbing oxygen existing in a package. This oxygen absorbing packaging may prevent articles from deteriorating due to an influence of oxygen or eroding due to microbes under the existence of oxygen.

Therefore, various packages of articles delivered to general consumers generally contain an oxygen absorbing agent.

The oxygen absorbing packaging can be attained by enclosing foodstuffs, pharmaceuticals or the like to be stored in a container having a property of blocking permeation of a gas together with oxygen absorbing member in which oxygen absorbing agent is contained. Generally, this oxygen absorbing member is supplied in the form of a small bag of gas permeable packaging member containing oxygen absorbing composition in granular or powder shape.

In many cases, it is desired that such a small bag of oxygen absorbing agent (sometimes simply referred to as a "small bag") is secured to an inside surface of a container. Thereby, an oxygen absorbing agent is prevented from being mixed in and eaten with articles (foodstuff), or being accidentally cooked with articles.

Various methods of securing this small bag are proposed. Generally, small bags are attached to an inner wall surface of packaging members, such as packaging bags or containers (carton, box, etc.) by use of an adhesive agent, a hot melt agent or a pressure sensitive adhesive double coated tapes.

However, it is also difficult, in many cases, to sufficiently secure the small bag to a container because the surface of the small bag is often uneven and the small bag is swollen. If a small bag is secured to a container by any chance, it is often secured to a container in part, but not entire surface of a small bag.

As a result, the area of a small bag not in contact with the surface of a container creates a gap. Such a gap causes various problems, namely, stored articles are jammed in or hooked at the gap, and thus smooth handling of the articles can be disturbed or the small bag falls off from the container.

Moreover, a conventional oxygen absorbing member using powdery oxygen absorbing composition has a problem in that the powder sprays in the air when it is to be filled in the gas permeable packaging member and thus a part of the powder adheres to the surface of the small bag.

Then, it was proposed to have a container itself having oxygen absorbing property. In the Japanese Patent (Kokoku) Publication No. 62-1824 and the Japanese Patent (Kokoku) Publication No. 4-6082, manufacturing exterior structure with a film containing an oxygen absorbing agent is disclosed.

However, the oxygen absorbing property in the prior art has been insufficient. The conventional packaging member has further problems in that since packaging of a bag or container itself is manufactured by using a special packaging member, the cost of the container increases which leads to an increase in the price of the articles.

In the Japanese Patent Laid-Open Publications Nos. 2-86758, 54-114585, 55-44344, 56-26524, the Japanese Utility Model Laid-Open Publication No. 60-10768, the Japanese Patent Laid-Open Publications Nos. 55-109428 and 55-109428, forming an oxygen absorbing agent in a sheet like shape is disclosed. The prior art also discloses the prevention of exposure of a surface of the sheet shaped oxygen absorbing agent by covering the agent by a wrapping material. Thus, direct contact of the oxygen absorbing agent and foodstuff is prevented.

Since the sheet shaped oxygen absorbing agent is not a granule or powder, it is advantageous in that no leakage of granule or powder within the package is likely to happen due to destruction of the package, unlike the case of the conventional oxygen absorbing member in a small bag.

When this sheet shaped oxygen absorbing member is attached to a container, the method of cutting the sheet in a predetermined size and then adhering the sheet to a predetermined place in the container by using adhesive agent can be considered. If this method is applied, the side edge of the oxygen absorbing layer is exposed to the atmosphere when the sheet is cut out. In this case, the above-mentioned direct contact occurs, and it is burdensome to apply adhesive to the sheet so cut out. Moreover, the conventional sheet shaped oxygen absorbing agent has a problem in that its oxygen absorbing property is rather weak.

SUMMARY OF THE INVENTION

Now, the object of the present invention is to provide a sheet shaped oxygen absorbing member wherein the oxygen absorbing agent is not exposed to the atmosphere and may be readily adhered to a packaging member.

In addition, another object of the present invention is to provide a sheet shaped oxygen absorbing member with a good oxygen absorbing property.

Yet another object of the present invention is to provide a method for manufacturing such a sheet shaped oxygen absorbing member.

Since the conventional oxygen absorbing member contained in a small bag has the problems explained below, an object of the present invention is to provide a sheet shaped oxygen absorbing member that is not likely to be destroyed when it is used in a microwave oven.

When a container in which the small bag shaped oxygen absorbing member is contained is to be heated in a microwave oven, since the oxygen absorbing agent contains a metal as an oxygen absorbing component, the oxygen absorbing agent may generate heat and sparks, etc. under the influence of the microwaves irradiated from the microwave oven and destroy the bag of oxygen absorbing member.

In order to achieve these objectives, the invention according to this application discloses a sheet shaped oxygen absorbing member which has an oxygen absorbing property and is attachable to a packaging member, comprising: an oxygen absorbing layer capable of absorbing oxygen within the packaging member; a gas permeable layer to cover the oxygen absorbing layer; and a base permeable layer supporting the oxygen absorbing layer and the gas permeable layer, the base layer having an adhesive layer for attaching the oxygen absorbing layer and the gas permeable layer to the packaging member. In the sheet shaped oxygen absorbing member the gas permeable layer is directly attached to the base layer at the periphery of the oxygen absorbing layer.

The sheet shaped oxygen absorbing member further comprises a separator layer to which the base layer attaches having the adhesive layer in between and the base layer is peeled off from the separator layer when the oxygen absorbing member is used.

The oxygen absorbing layer, the gas permeable layer and the base layer are preferably formed to be a self adhesive strip (it may be sometimes called as a "label-like shape"). The separator may be formed into a belt like shape to which a plurality of the labels may be continuously attached.

The oxygen absorbing layer is preferably obtained from the sheet shaped oxygen absorbing agent. The oxygen absorbing agent is made of a mixture of an iron-based oxygen absorbing composition and a thermoplastic resin. The base layer may further comprise a base material consisting of at least one of a plastic film, an unwoven cloth or paper. On the surface of the base layer facing the separator layer, necessary notes may be printed.

The oxygen absorbing layer has an oxygen absorbing velocity of 100 ml/m$^2$·Hr or more at a temperature of 25° C. The separator layer comprises either paper on which mold release agent is applied, a resin film or metallic foil, or a combination of these.

The thickness of the sheet shaped oxygen absorbing member is preferably in the range of 0.1 to 5 mm. The oxygen absorbing layer may also have a lamination of a sheet containing water.

The sheet shaped oxygen absorbing member is manufactured through the method comprising: a first step of locating the gas permeable layer to cover the oxygen absorbing layer containing the oxygen absorbing agent; a second step of locating the oxygen absorbing layer and the gas permeable layer on the separator layer having the base layer containing the adhesive layer in between; a third step of punching the oxygen absorbing layer, the gas permeable layer and the base layer to be a self adhesive strip locating boundary at the area where the gas permeable layer has direct contact with the base layer; and a forth step of removing areas other than the area so punched.

According to the present invention, the oxygen absorbing member may easily be attached to the package, such as a packaging bag, a container or other packaging member, by the adhesive layer contained in the base layer. Moreover, since the oxygen absorbing layer is covered by the gas permeable layer not only at the top surface thereof but also at all the side walls in such manner that the gas permeable layer directly attaches to the base layer around the periphery of the oxygen absorbing layer, the oxygen absorbing layer is not exposed when the sheet shaped oxygen absorbing member is attached to the packaging member or a separator layer, discussed later, by the adhesive layer of the base layer.

Furthermore, the sheet shaped oxygen absorbing member further comprises a separator layer to which the base layer is attached having the adhesive layer in between, and thereby the sheet shaped oxygen absorbing member may promptly be attached to the packaging member, such as a container, by simply peeling off a unit of the oxygen absorbing layer, the gas permeable layer and the base layer from the separator layer when the container is filled with the articles or otherwise necessary.

The oxygen absorbing layer, the gas permeable layer and the base layer is preferred to be in a form of a self adhesive strip. If the self adhesive strip is formed in a predetermined size in advance, and the self adhesive strip is peeled off from the separator when necessary, the desired amount of the oxygen absorbing agent may easily be attached to the container.

Furthermore, by forming the separator layer into a belt-like shape and continuously attaching a plurality of the self adhesive strips thereon, a structure having a series of oxygen absorbing members located in line can be provided. From such a structure, the self adhesive strips containing a predetermined amount of oxygen absorbing agent are continuously supplied, therefore the process of attaching the sheet shaped oxygen absorbing member to the container can be continuously performed, and it is also beneficial to automate such process.

The base layer has an adhesive layer to attach the oxygen absorbing layer and the gas permeable layer to the packaging member. Thus, by using this adhesive layer, the oxygen absorbing layer and the gas permeable layer may be attached to the separator layer. After the oxygen absorbing layer, the gas permeable layer and the base layer are peeled off from the separator layer, the oxygen absorbing layer and the gas permeable layer may be attached to the container by an adhesive layer of the base layer in such manner that the gas permeable layer covers the oxygen absorbing layer.

Now, the structure of the sheet shaped oxygen absorbing member according to the present invention is explained in detail.

Separator Layer:

The separator layer has a function of a supporting member to support the oxygen absorbing layer, the gas permeable layer and the base layer, as well as a function of protecting an adhesive surface of the base layer. When the oxygen absorbing layer, the gas permeable layer and the base layer comprise one unit in the form of a self adhesive strip, the separator layer has a function of a common supporting member for the plurality of self adhesive strips. The self adhesive strips are peeled off from the separator layer when the oxygen absorbing member needs to be used.

The separator layer comprises paper on which a release agent, such as silicon resin or paraffin wax, is applied, film or metallic foil, or a combination of any of these.

The materials to be used for a separator layer are preferred to have strength against machine use so that it may resist the processing conditions for the manufacture of the sheet shaped oxygen absorbing member. Furthermore, a material with such stiffness, shrinkage ratio, hygroscopic property or the like as causing none or little warping or peeling, so that the size of the material does not change during the manufacturing process is properly selected for the separator layer. Paper is generally used. It is also preferred to use a resin film or a metallic foil not creating paper dust, so as to eliminate any possibility of dusts being mixed in foodstuffs.

The release agent will be determined according to the property of the adhesive layer of the base layer, taking into consideration the balance of the adhesiveness and the peelability between the adhesive layer and separator layer.

Base Layer:

The base layer functions as a supporting member to support the oxygen absorbing layer and the gas permeable layer after these layers are peeled off from the separator layer.

The base layer comprises an adhesive layer for attaching the oxygen absorbing layer and the gas permeable layer to the packaging member. When the sheet shaped oxygen absorbing member comprises a separator layer, the adhesive layer is initially attached to the separator layer.

Preferably, the base layer has a base material having shape stability, and the adhesive layer consists of a first adhesive layer to attach the oxygen absorbing layer and the gas permeable layer to the base layer, and a second adhesive layer to attach the base member to the separator layer. In such case, the oxygen absorbing layer and the gas permeable layer are to be attached to the separator layer or a packaging member placing the base material of the base layer, and the first and second adhesive layer in between.

Any other structure of the base layer may also be adopted. The structure of the base layer may be changed according to the structure of the oxygen absorbing layer and the gas permeable layer. For example, if there is an adhesive layer on the gas permeable layer, the above-mentioned first adhesive layer may be omitted. Most simply, it is possible to omit the base material and to structure the base layer with only one adhesive layer which is an integral form of the first and the second adhesive layer. For example, one adhesive film is used as a base layer.

As discussed above, the adhesive layer of the base layer has a function of attaching the oxygen absorbing layer and the gas permeable layer to the separator layer. The adhesive layer has a further role of securing the oxygen absorbing layer and the gas permeable layer to the container after the base layer supporting the oxygen absorbing layer and the gas permeable layer are peeled off from the separator layer.

As used herein, the term "attached" has a broad meaning of adhering, attaching, securing or sealing two surfaces by various methods, such as various adhesive agents, hot melt agents, or a heat seal having a property of sealing by heat melt.

The stability of the shape of the oxygen absorbing layer and the gas permeable layer may be enhanced by making the base layer contain the base material after these layers are peeled off from the separator layer. In other words, when the oxygen absorbing layer and other layers are peeled off from the separator, the base material prevents the oxygen absorbing layer or other layers from curling.

Moreover, the base material has a function of a communication medium. Information, such as characters or figures, may be printed on the surface of the base material to face the separator layer. Such information communicates necessary matters to consumers. Even after the attachment of the sheet shaped oxygen absorbing member to a container, the consumers may recognize information, such as the name of the article or notice printed on the base material, from outside the container, if the container is transparent. It helps to eliminate a process of printing such information on the container. Furthermore, by making the base material or the adhesive layer of the base layer opaque, the oxygen absorbing layer cannot be seen from outside to maintain the fine appearance of the article.

As for a base material, at least one of a plastic film, unwoven cloth, paper or the like is used. The adhesive layers having a function of the adhesive agent are laminated on the both surfaces of the base material by any known methods, such as coating or lamination. Thereby, a preferred form of the base layer is completed. As an adhesive layer, for example, a thermoplastic resin can be used. Preferably, the thermoplastic resin is laminated and then heat sealed on the base material.

Oxygen Absorbing Layer:

The oxygen absorbing layer comprises an oxygen absorbing agent. The oxygen absorbing agent is made of an oxygen absorbing composition. Preferably, a mixture of the oxygen absorbing composition and a resin such as thermoplastic resin may be used. By forming such mixture into a sheet like shape, a sheet shaped oxygen absorbing agent can be obtained.

The oxygen absorbing layer is structured preferably to have an oxygen absorbing velocity of 100 ml/m$^2$.Hr or more, or more preferably 200 ml/m$^2$.Hr or more at a temperature of 25° C. Thereby, practical usage level of oxygen absorbing velocity can be maintained even in the case of so-called one surface absorption, i.e., one surface of the oxygen absorbing layer is attached to a container and another surface of the oxygen absorbing layer absorbs oxygen.

Methods of manufacturing oxygen absorbing agent and oxygen absorbing layer should not be specifically restricted. Any conventional oxygen absorbing agent or conventional manufacturing methods may be used. A metal-based oxygen absorbing composition, a main ingredient of which is a metallic component, such as iron, or an organic-based oxygen absorbing composition, a main ingredient of which is an organic component, such as ascorbic acid, can be used.

Examples of the sheet shaped oxygen absorbing agent according to the present invention include sheet shaped oxygen absorbing agents manufactured by: dispersing an oxygen absorbing composition in a thermoplastic resin, the main ingredient of which is iron powder, ferrous salt, ascorbic acid, ascorbic acid salt, catechol or the like; further drawing the oxygen absorbing composition so dispersed (Japanese Patent Laid-Open Publication No. 2-72851); treating the thermoplastic resin containing the oxygen absorbing composition to foam (Japanese Patent Laid-Open Publication NO. 56-26524); dispersing the oxygen absorbing composition in a fiber material, such as pulp containing a thermoplastic resin (Japanese Patent Laid-Open Publication No. 2-86758); pressurizing or heating the mixture of the oxygen absorbing composition and the thermoplastic resin powder, or integrating it by pressurizing or heating; coating paper or plastic film with a coating material in which the oxygen absorbing composition are mixed; or dispersing catalyzer containing transition metal, such as cobalt or iron, into a resin, such as polyolefin or polyamide. (The term "sheet shaped" may be expressed as a "film shaped.")

Particularly preferred is an oxygen absorbing layer wherein an oxygen absorbing agent, the main ingredient of which is iron powder having an outstanding oxygen absorbing property is used. Furthermore, the sheet shaped oxygen absorbing agent wherein a mixture of a polyolefin-based resin, such as polyethylene, and the iron powder-based oxygen absorbing agent is formed into a sheet like shape and is further drawn (Japanese Patent Laid-Open Publication No. 2-72851), or wherein a mixture of iron powder-based oxygen absorbing composition, a pulp and a polyolefin-base resin or thermoplastic fiber is formed into sheet-like shape through thermocompression bonding (Japanese Patent Laid-Open Publication No. 2-86758) realizes high oxygen absorbing performance, simplifies the manufacturing process and has outstanding resistance against microwaves, and thus can be preferably used.

A structure wherein the iron powder-based oxygen absorbing composition is dispersed into the polyolefin-based resin and then is formed into sheet like shape resists microwaves, and thus it is prevented from causing sparks or abnormal heating when cooked with foodstuffs in a microwave oven. Thereby, any possibility of leakage of oxygen absorbing composition or other ingredient can be eliminated.

Preferred oxygen absorbing velocity for an oxygen absorbing layer can be achieved by selecting an appropriate type of oxygen absorbing agent or composition, type of resin, and content of oxygen absorbing agent or composition. The embodiments discussed later in this application are the examples of realizing such an oxygen absorbing velocity. In addition, such an oxygen absorbing velocity may be realized by using the following embodiments.

As an oxygen absorbing agent composition, the main ingredient of which is iron powder, a composition comprising iron powder and metal halide is preferred. Other components, such as activated carbon or a filler material which is slightly soluble with water, can be added to the composition when necessary.

The oxygen absorbing composition can be simple mixture of the above-mentioned ingredients. However, the oxygen absorbing composition using the iron powder or a mixture of iron powder and activated carbon, etc., coated with metal halide salt, or iron powder or a mixture of iron powder and activated carbon, etc. wherein metal halide salt is rubbed on its surface enhances the oxygen absorbing property and thus is preferred.

The metal halide includes, for example, sodium chloride, potassium chloride, calcium chloride and magnesium chloride.

A smaller particle size of the oxygen absorbing composition is more preferred. Generally, the particle size of the oxygen absorbing composition is preferred to be 100 $\mu$m or less, and more preferred to be 50 $\mu$m or less.

As a thermoplastic resin, for example, low density polyethylene; high density polyethylene; polypropylene; ethylene and $\alpha$-olefin copolymer; polyamide, such as polymethylpentene; polyester, such as polyethylene terephthalate; and polyolefin fluoride, such as polytetrafluoroethylene are advantageously used. Among these materials, polyolefin resin is particularly preferred from the view point of simplicity of the manufacturing process.

After processing the resin composition comprising 15 to 75 weight percent of resin and 30 to 85 weight percent of iron powder-based oxygen absorbing agent into a sheet-like shape, it is further drawn in at least a direction of one axis. The expansion rate of drawing is preferred to be in the range of 1.5 to 10 times the original size.

Any appropriate thickness of the oxygen absorbing layer may be selected taking into consideration of readiness of processing, the realization of the desired oxygen absorbing velocity, or type or material (composition) of the oxygen absorbing agent. This thickness is preferably in range of 0.05 to 4 mm, more preferably 0.1 to 3 mm. Any appropriate shape of the oxygen absorbing layer may be selected taking into consideration the purpose of use of the member having an oxygen absorbing property according to the present invention. Any appropriate size (surface area) of the oxygen absorbing layer may also be selected in the same manner.

Either a water dependent type or self-reactive type of oxygen absorbing composition may be used. However, a water dependent type which makes use of water evaporated from the subject stored in packaging member is preferred because a moisture supplying agent will not be necessary. Regardless of which type of oxygen absorbing agent product is used, it is preferred to laminate a sheet containing water on the sheet shaped oxygen absorbing agent to supplement is oxygen absorbability. Furthermore, the oxygen absorbing layer may further contain a composition to grant additional function to it, such as to absorb a gas other than oxygen, generate a desired gas or contain deodorizing agent, or a layer having such function may be laminated on the sheet shaped oxygen absorbing agent.

Gas Permeable Layer:

The gas permeable layer achieves its roll of preventing the oxygen absorbing layer from being directly exposed by coating the oxygen absorbing layer. Moreover, the gas permeable layer has a function of supplying oxygen within the container to the oxygen absorbing layer. The gas permeable layer further has a function of adjusting gas permeability and moisture permeability within an appropriate range. The following range is a preferred range of permeability.

The gas permeable layer has an oxygen permeability of 10,000 cc/m$^2 \cdot$24 Hr$\cdot$atm or more, or preferably 30,000 cc/m$^2 \cdot$24 Hr$\cdot$atm or more, or more preferably 50,000 cc/m$^2 \cdot$24 Hr$\cdot$atm or more. The oxygen permeability of 10,000 cc/m$^2 \cdot$24 Hr$\cdot$atm or more is sufficient to prevent the oxygen within the packaging member from causing the oxidation or deterioration of the article.

A material conventionally used to wrap an oxygen absorbing agent may be used as a gas permeable layer. For example, a single layer of a packaging member wherein a perforated film is laminated on one or both surfaces of paper, water resisting unwoven cloth, a microporous film made of polyolefin or synthetic paper or a lamination of such single layer and other material can be used. A packaging member which uses gas permeability on its side edge because the gas permeability of its top surface is low, can also be used.

If the base layer comprises a base material, any one of a silicon resin, a fluorocarbon resin or a polymethyl penetene film, or a film of a combination of any of the above, whose heat seal characteristics are weak, may be used as a gas permeable layer, by providing an adhesive layer on the base layer to attach gas permeable layer and the base layer. Furthermore, even if that which is to be stored within the container is liquid or articles of high water content, rust is prevented from eluting from the oxygen absorbing layer by selecting a gas permeable material having resistivity against water, for example a non-corrosive property against water or prevention of elusion of water.

Characters or figures may be indicated on the gas permeable layer. In such case, the gas permeable layer is structured with a plurality of layers, and on the outer most layer, transparent and gas permeable layer on which no character is printed is placed. It is so structured so that foodstuffs, etc. within the container has no direct contact with an ink used to print such figures, etc.

The gas permeable layer is attached to the base layer in such manner as to cover the oxygen absorbing layer. At the periphery of the oxygen absorbing layer, the gas permeable layer is directly attached to the base layer without placing the oxygen absorbing layer in between. Therefore, the gas permeable layer prevents the side edge of the oxygen absorbing layer from being exposed to atmosphere, which cannot be covered under the prior art. In this regard, the gas permeable layer will be structured having sufficient size to completely cover the top surface and side edges of the oxygen absorbing layer and to have direct contact with the base layer.

The gas permeable layer may be attached to the base layer in such manner as to provide an adhesive layer containing an adhesive agent on the surface of the gas permeable layer to face the separator layer and to attach the adhesive layer to the base layer. In such case, preferably careful attention is paid so that the adhesive layer does not hinder the gas permeability.

The oxygen absorbing layer, gas permeable layer and the base layer are formed to be a self adhesive strip of a restricted size, and each strip is continuously attached to a separator layer in belt like shape to obtain continuous self adhesive strips. Since each layer of the self adhesive strip has a laminated sheet shape, the continuous self adhesive strips may be easily stored in a roll shape by winding it on a drum, etc.

When the self adhesive strip is to be attached to a container, the strips are peeled off from the separator layer one by one unwinding the roll and are attached to the containers. Each of these processes may be automated by a certain device. The self adhesive strip is preferred to be in a sheet like shape as well as to be thin. As a result, there is no trouble storing it, and the operation of attaching the self adhesive strips to the containers becomes easier. Moreover, if it is attached to the container, the self adhesive strip does not present an obstacle when the container is filled with the stored subject. The thickness of the self adhesive strip is preferably in the range of 0.1 to 5 mm, and more preferably in range of 0.3 to 3 mm.

When the separator layer is wound on a drum, etc., deterioration of the oxygen absorbing property of the self adhesive strip during its storage can be restricted because the gas permeable layer of the self adhesive strip has close contact with the rear surface of the separator of another self adhesive strip.

Any shape of the self adhesive strip, such as square, circle or oval, can be adopted as appropriate.

The present invention also provides a sheet shaped oxygen absorbing member which has an oxygen absorbing property and is attachable to a packaging member comprising a separator layer, an adhesive base layer, an oxygen absorbing layer and a gas permeable layer which are laminated in the above order. The oxygen absorbing layer comprises a sheet shaped oxygen absorbing agent with a groove cut from at least one of its surface toward the opposite surface, and the gas permeable layer is directly attached to the base layer at the periphery of said oxygen absorbing layer.

The present invention is characterized in that it is a laminated structure member, which utilizes the property of a sheet shaped oxygen absorbing agent. In other words, the present invention is characterized by its laminated structure in which the oxygen absorbing layer is not exposed, and because of which the laminated structure member can be used by easily peeling off the separator layer and then being attached to a package member through the exposed adhesive layer, and which is flexible and has good adhesiveness to the package.

It is preferable to use, as a main ingredient of the second adhesive layer, any one of acrylic-type, styrene-isoprene-styrene-type, styrene-butadiene-type or styrene-ethylene/butylene-styrene-type copolymer or blockcopolymer, or a combination of the above-mentioned copolymers or blockpolymers. Furthermore, for the adjustment of adhesivity, an additive such as tackifier may be suitably added to the above.

Figure 4:
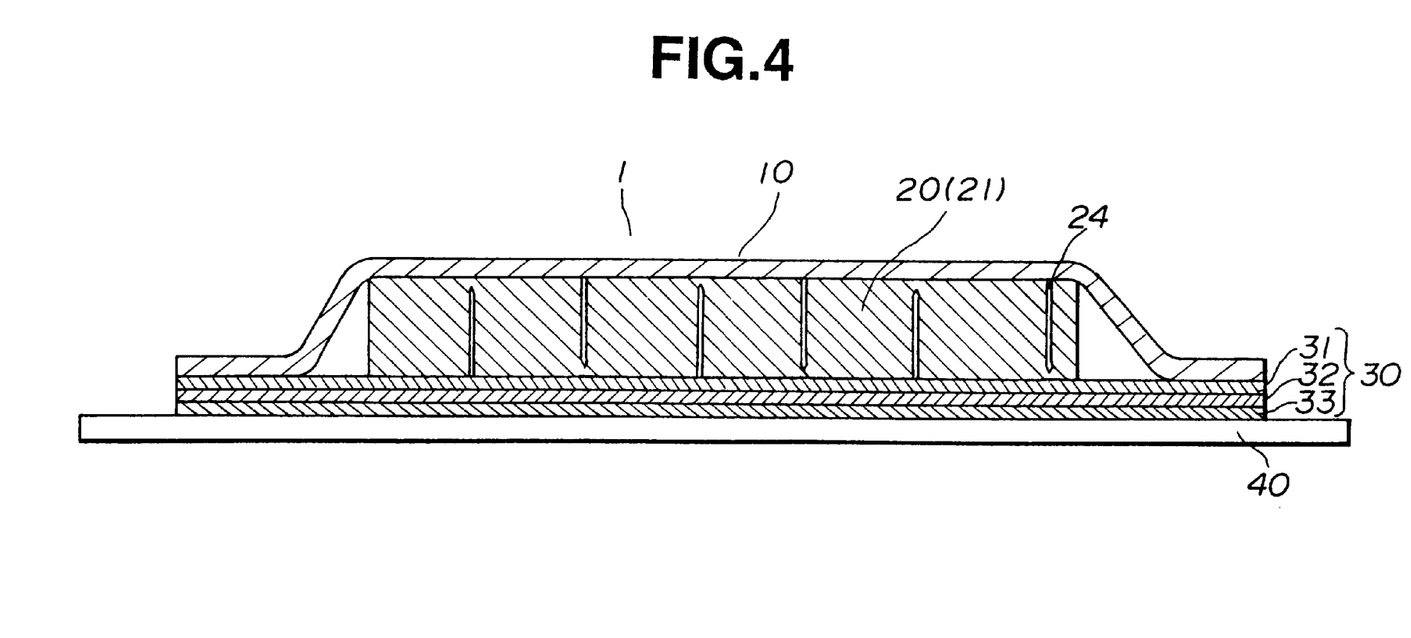
FIG. 4 is a partial sectional view of one embodiment of the sheet shaped oxygen absorbing member with grooves.
Figure 5:
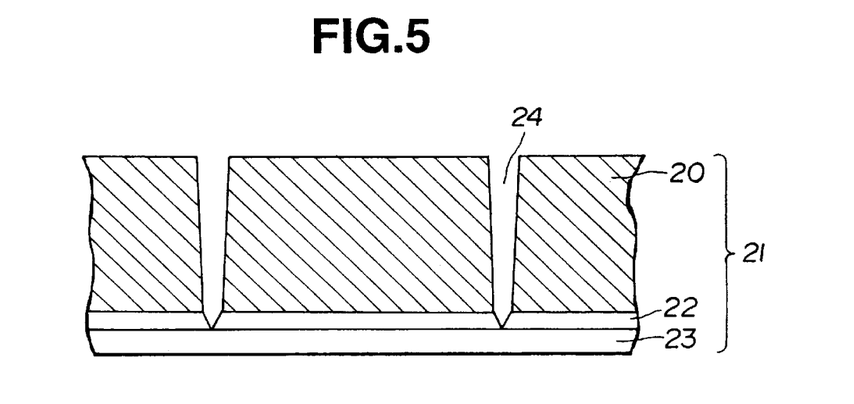
FIG. 5 is a partial sectional view of one embodiment of the sheet shaped oxygen absorbing agent with grooves cut from one surface toward a opposite surface.
Figure 6:
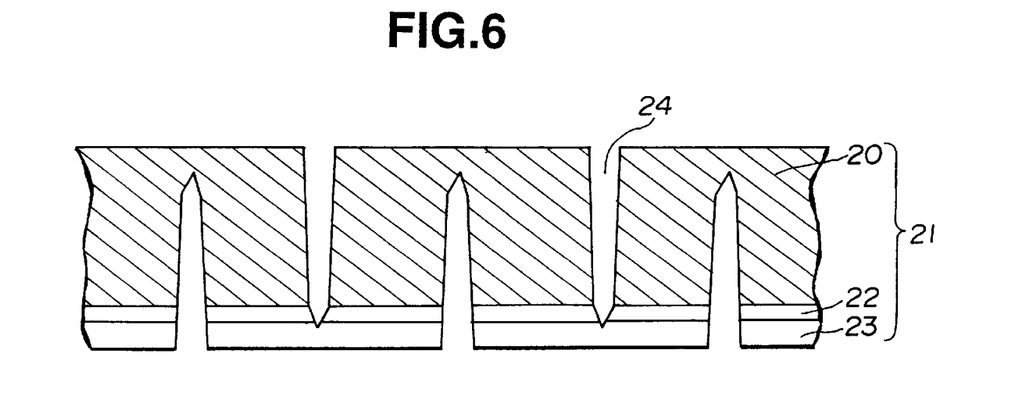
FIG. 6 is a partial sectional view of one embodiment of the sheet shaped oxygen absorbing agent with the grooves respectively cut from both surfaces toward opposite surfaces.
Figure 7:
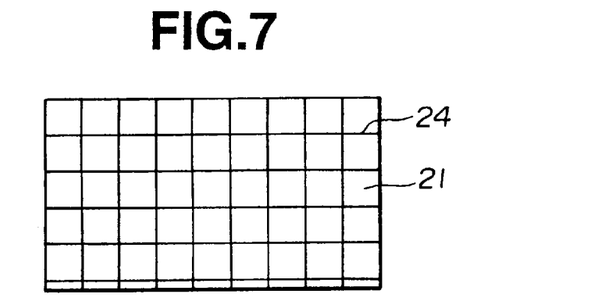
FIG. 7 is a top view of one embodiment of the groove pattern.
Figure 8:
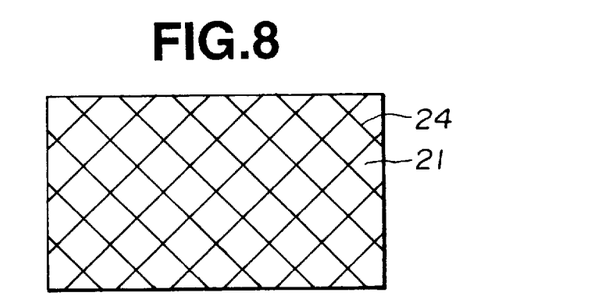
FIG. 8 is a top view of one embodiment of the groove pattern.
Figure 9:
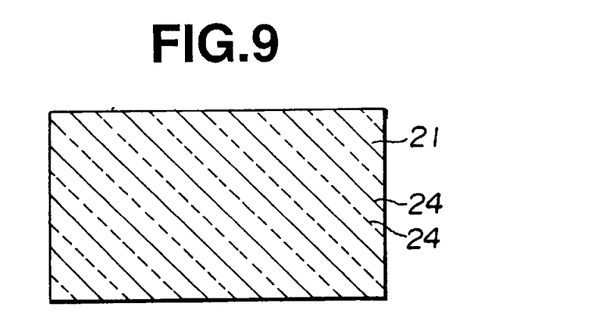
FIG. 9 is a top view of one embodiment of the groove pattern.
Figure 10:
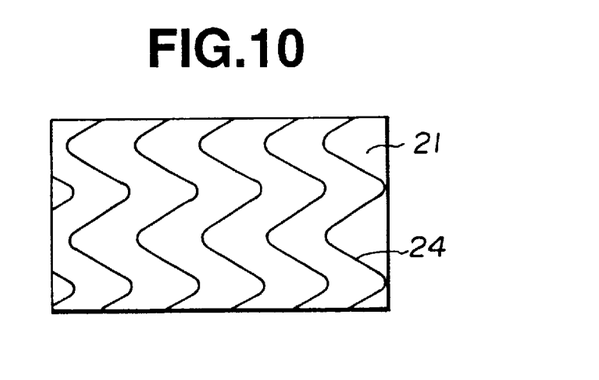
FIG. 10 is a top view of one embodiment of the groove pattern.

As shown in FIGS. 4 through 6, the oxygen absorbing layer may be composed of a sheet shaped oxygen absorbing agent with a groove 24 cut from at least one surface toward the opposite surface. In the above figures, reference numeral 22 indicates an adhesive layer and reference numeral 23 indicates a deodorizing layer. According to the present invention, if the adhesive layer 22 and the deodorizing layer 23 are formed on one side of the oxygen absorbing layer 20, as shown in FIGS. 4 through 6, the lamination of these three layers is defined as a sheet shaped oxygen absorbing agent.

The shape of the groove 24 can be freely set, such as stripe, lattice, rhombic or spiral shapes, according to the purpose for which the sheet shaped oxygen absorbing member is to be used. The groove 24 is to be cut either from one surface or from both surfaces of the oxygen absorbing agent, without causing the oxygen absorbing agent to be torn in its entirety along the groove. Accordingly, it is preferable to cut the groove with a depth which makes the thickness of the sheet shaped oxygen absorbing agent at least 0.01–0.5 mm from the bottom of said groove to the opposite surface of said sheet shaped oxygen absorbing agent.

A deeper groove is preferable because it will yield higher flexibility when the product is completed. However, if the thickness of the sheet shaped oxygen absorbing agent from the bottom of said groove to the opposite surface of said sheet shaped oxygen absorbing agent is less than 0.01 mm, the intensity and processability during the manufacturing process of the product tend to decrease. Moreover, there is a fear that the merchandized sheet shaped oxygen absorbing agent may easily come off if the groove is mistakenly cut away by an edged tool.

On the other hand, if the thickness of the sheet shaped oxygen absorbing agent from the bottom of said groove to the opposite surface of said sheet shaped oxygen absorbing agent exceeds 0.5 mm, it is difficult to obtain the flexibility effect by the groove.

The thickness of the sheet shaped oxygen absorbing agent from the bottom of said groove to the opposite surface of said sheet shaped oxygen absorbing agent does not necessarily have to be constant in its entirety. For example, a part of the groove may be completely penetrated and detached like a perforated tear line, and in such case, one groove must have at least one portion of the thickness, which should be at least 0.01 mm but no more than 0.5 mm thick.

The total length of the groove over the surface of the sheet shaped oxygen absorbing agent can be set according to the purpose for which the sheet shaped oxygen absorbing member is used. It is desirable to set such total at least 0.02 $mm/mm^2$ and/or no more than 10 $mm/mm^2$ as regards the projected area of the sheet shaped oxygen absorbing agent.

It is undesirable if the total length of the groove is too long, because the sheet shaped oxygen absorbing member held in the sheet shaped oxygen absorbing agent will easily come off because of the groove. On the other hand, if the total length of the groove is too short, the flexibility effect of the groove will decrease.

It is preferable that, according to the purpose of its use, the groove is cut in a direction toward which flexibility of the oxygen absorbing agent is required, and if flexibility is required in an oblique direction, the groove may be cut in a stripe shape in a oblique direction or rhombic lattice. Furthermore, if the direction toward which flexibility of the oxygen absorbing agent is required is a curve, the grooves can be made in various shapes such as a spiral shape. The groove does not necessarily have to cover the entire surface of the sheet shaped oxygen absorbing agent, but can be made at a part of the sheet shaped oxygen absorbing agent if the required flexibility is attained.

DETAILED DESCRIPTION OF PREFERRED EMBODIMENTS

Preferred embodiments of the present invention are explained below.

Figure 1:
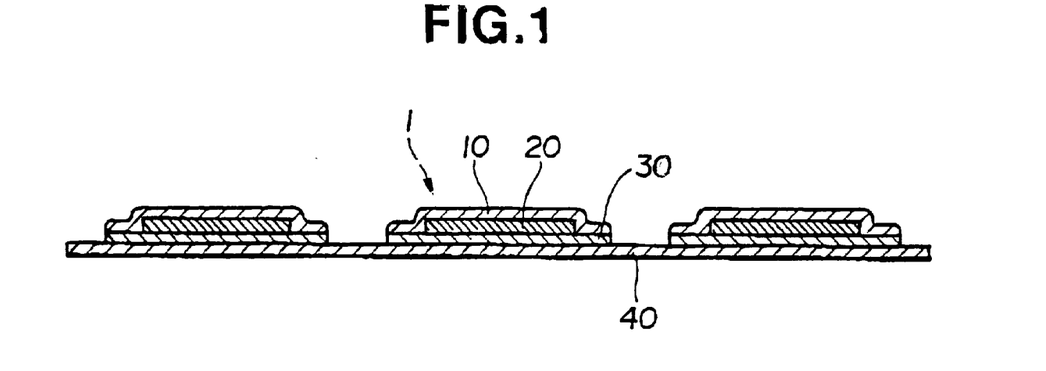
FIG. 1 is a cross section of a continuous self adhesive strip type oxygen absorbing member.

FIG. 1 illustrates the first embodiment of a structure having an oxygen absorbing property. FIG. 1 illustrates a cross section along the longitudinal direction of a separator.

Figure 2:
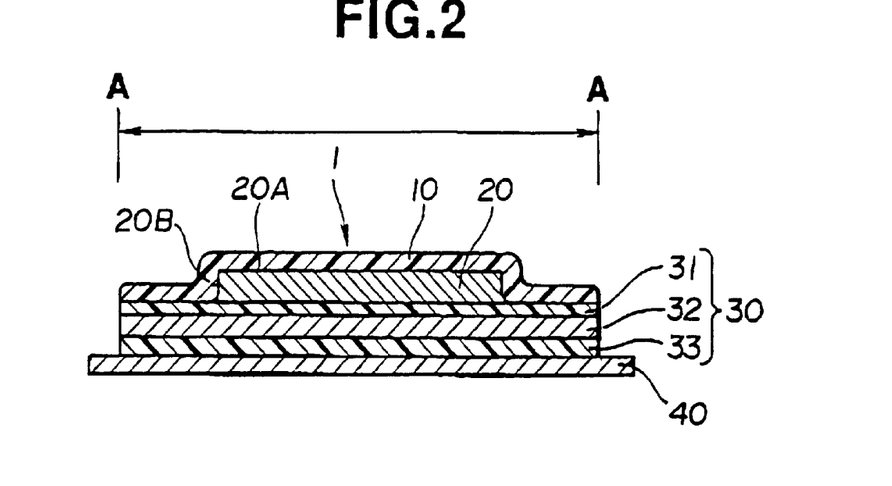
FIG. 2 is a cross section of one embodiment of a self adhesive strip type oxygen absorbing member.

A plurality of a self adhesive strip type oxygen absorbing members 1 are attached at equal distance on a surface of a belt like separator layer comprising release agent coated paper. An enlarged view of the self adhesive strip type oxygen absorbing member is shown in FIG. 2.

The self adhesive strip type oxygen absorbing member consists of an oxygen absorbing layer 20 formed into a sheet like shape, a gas permeable layer 10 covering the oxygen absorbing layer, and a base layer 30 attaching the oxygen absorbing layer 20 and the gas permeable layer 10 to the separator layer 40.

The base layer consists of a base material 32, a first adhesive layer 31 and a second adhesive layer 33. The first adhesive layer 31 attaches an oxygen absorbing layer 20 and a gas permeable layer 10 to the base material 32, and the second adhesive layer 33 attaches a base material 32 to the separator layer 40.

According to this structure, the oxygen absorbing layers and the gas permeable layer 10 can be sufficiently attached to the separator layer 40, and at the same time, the base layer 32 supports the layers 10 and 20.

The second adhesive layer 33 may peel off from a separator 40. By attaching the second adhesive layer 33 to a container (not shown), a self adhesive strip type oxygen absorbing member 1 consisting of an oxygen absorbing layer 20, a gas permeable layer 10 and a base layer 30 is secured to a container.

The gas permeable layer 10 is structured to have a surface area greater than that of the oxygen absorbing layer 20. As shown in FIGS. 1 and 2, the gas permeable layer 10 covers the surface 20A and the side 20B of the oxygen absorbing layer 20, and, at the same time, is directly attached to the first adhesive layer 31 at the periphery of the oxygen absorbing layer.

According to such a structure, the oxygen absorbing layer 20 is prevented from being exposed when self adhesive strip oxygen obsorbing member 1 is peeled off from the separator layers 40 and then secured to the packaging member. When this self adhesive strip is attached within the container, oxygen is supplied from the gas permeable layer 10 surface, and is absorbed by an oxygen absorbing agent composition contained in the oxygen absorbing layer.

Figure 3:
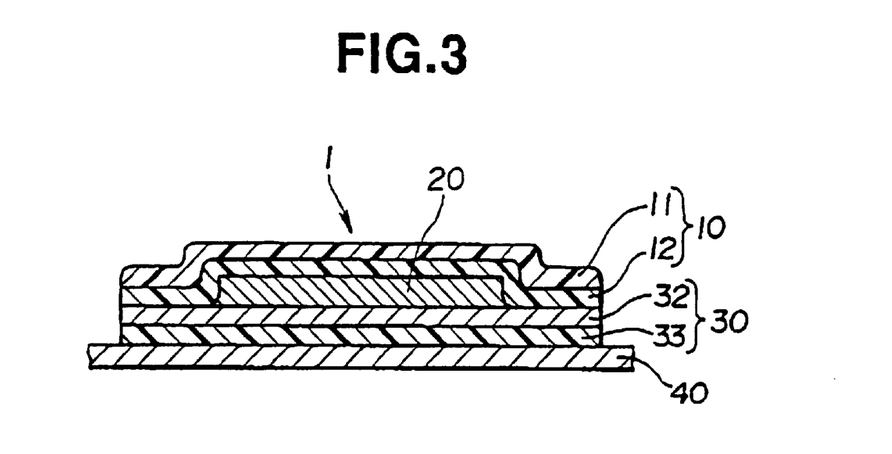
FIG. 3 is a cross section of one embodiment of a self adhesive strip type oxygen absorbing member.

FIG. 3 illustrates a second embodiment of the oxygen absorbing member. The second embodiment is different from the first embodiment in that the gas permeable layer 10 comprises a first gas permeable layer 11 and an adhesive layer 12 having a gas permeability property, and the gas permeability layer is attached to the base material 32 of the base layer 30 by such an adhesive layer 12. Since such an adhesive layer 12 is provided on the surface of the gas permeable layer, the first adhesive layer 31 as described in the first embodiment is not provided on the base layer.

Examples of the manufacturing method of such an oxygen absorbing agent are now explained.

A first adhesive layer 31 and a second adhesive layer 33, as explained above, are formed on respective surfaces of the base material 32. One surface of the base material is attached to the separator layer 40. Sheet shaped oxygen absorbing layer 20 is attached on another surface of the base material. A gas permeable layer 10 is layered on the oxygen absorbing layer 20 to completely cover the oxygen absorbing layer, and then is pressed towards the base material 32 to completely attach the gas permeable layer on the surface of the base material.

Then, such area of the lamination as shown in A—A in FIG. 2 is punched by using a cutting die applied to the base layer. Unnecessary portions of the base layer and the gas permeable layer, i.e., outside the A—A area, are peeled off from the separator, and then the self adhesive strip type oxygen absorbing member is obtained.

Since the boundary of the punch is placed where the gas permeable layer 10 is directly attached to the base layer 30 on the periphery of the oxygen absorbing layer, the cut oxygen absorbing layer is not exposed to the atmosphere after punching.

By placing a plurality of self adhesive strips 1 on a separator layer at a predetermined pitch, a continuous series of oxygen absorbing members wherein self adhesive strip-type oxygen absorbing members are continuously provided on the separator layer can be obtained.

If the first adhesive layer 31 consists of a heat seal agent, the gas permeable layer 10 and the base material 32 are attached to each other by pressing a predetermined heating jig on the gas permeable layer to fuse the heat seal agent on the periphery of the oxygen absorbing layer 20. If the gas permeable layer 10 comprises an adhesive layer 12, the oxygen absorbing layer 20 is first attached to the adhesive layer 12, and then the oxygen absorbing layer and the gas permeable layer are attached to a base material 32 wherein the separator layer 40 is attached on one surface.

By any of these methods, a structure wherein self adhesive strip type oxygen absorbing members are continuously attached on a belt shaped separator 40 can be obtained. of course, by extending the punch to the separator layer 40, separate self adhesive strips of oxygen absorbing agent composition can be obtained. Such a separate product may also be manufactured by cutting out the series of the products.

Practical examples of manufacturing the sheet shaped oxygen member and the test results using such a member are explained below.

EXAMPLE 1

One hundred parts of granular iron-based oxygen absorbing agent, wherein one hundred parts by weight of iron powder (average granular diameter of 70 $\mu$m) are coated with 3 parts by weight of sodium chloride by using sodium chloride aqueous solution, and 100 parts of polyethylene are mixed and extruded at a temperature of 190° C. to form a sheet like shape. This sheet is drawn in the lateral direction to four times the original size, to obtain a sheet shaped oxygen absorbing agent with 1 mm thickness. The sheet shaped oxygen absorbing agent so obtained has high absorption performance wherein its oxygen absorbing velocity is 200 ml/m$^2$.hr (25° C.) or more. An oxygen absorbing layer is formed by cutting the sheet shaped oxygen absorbing agent to an oval shape, the size of which is 52 mm×30 mm.

Synthetic rubber elastomeric adhesive is applied on one surface of an oval polypropylene film (thickness: 40 μm) by using a coater to form an adhesive layer. A silicone coated paper, which is a release agent coated paper, is attached to this surface, and then the same adhesive is applied on another surface of the polypropylene film to obtain a base layer (50×100 mm) having a separator layer.

A highly gas permeable adhesive sheet (manufactured by Nitto Denko Co., Ltd.), which is a fabric shaped adhesive agent, is attached to water and oil resisting paper. The product thereof is punched out to an oval shape of 64 mm×40 mm by using a cutting die to prepare a gas permeable layer.

An oval shaped oxygen absorbing layer is placed on the adhesive surface of the oval shaped gas permeable layer, and these two layers are sealed by compression leaving the oval edge of the gas permeable layer. The oxygen absorbing layer on which the gas permeable layer is sealed by compression is matched with the exposed adhesive surface of the base layer having a separator layer, and they are sealed by compression in such manner that the edge of the gas permeable layer completely attaches to the base layer. Finally, the base layer is punched out, by using cutting dies, in an oval shape having the same size as the oval-shaped gas permeable layer to obtain an oval self adhesive strip type oxygen absorbing member (64 mm×40 mm; Thickness: 2 mm).

The self adhesive strip type oxygen absorbing member is secured to the inside of a three way sealing bag (180×250 mm) made of a gas barrier film consisting of KON (polyvinylidene chloride coated oriented nylon) (15 μm)/PE (polyethylene) (20 μm)/LLDPE (linear low density polyethylene) (60 μm) by attaching an adhesive surface of the self adhesive strip type oxygen absorbing member appeared by peeling off the separator layer. Boiled udon (Japanese flour noodle) 200 g is inserted into the bag immediately after the self adhesive strip type oxygen absorbing member is attached to the bag, and the bag opening is heat sealed. Three packages of udon, in which the self adhesive strip type oxygen absorbing member is attached in the same manner, are prepared.

Those three packages of udon are kept in a room at a temperature of 25° C. Ten days later, the condition of the udon was observed and the oxygen content within the package was measured by a gas chromatograph. Then, the package was opened and held upside down, to see how the udon fell into a pot. The results are shown in Table 1.

EXAMPLE 2

The oval self adhesive strip type oxygen absorbing member having a size of 60×40 mm was obtained by the same method as described in Example 1 except for using water and oil resisting paper without a highly gas permeable adhesive sheet as a gas permeable sheet. Using the self adhesive strip type oxygen absorbing agent so obtained, tests of storage and opening and withdrawal after storage of an udon package were performed. The results are shown in the Table 1.

Comparison 1

In the same manner as described in Example 1, except for using the oval shape gas permeable layer having the same size as the oxygen absorbing layer (longer diameter: 52 mm, shorter diameter 30 mm), a gas permeable layer and an oxygen absorbing layer having the same size are layered, and then an oval self adhesive strip type oxygen absorbing member (longer diameter: 52 mm, shorter diameter: 30 mm) was obtained. The oxygen absorbing layer was exposed on the side edge of the self adhesive strip type oxygen absorbing member so obtained.

Using the oxygen absorbing member so obtained, tests of storage, opening and withdrawal after storage of udon packages were performed in the same manner as described in the Example 1. The results are shown in the Table 1.

Comparison 2

A piece of pressure sensitive adhesive double coated tape (manufactured by Nitto Denko Co., Ltd., No. 500) is attached at a center portion of one surface of a commercial oxygen absorbing agent contained in a small bag (manufactured by Mitsubishi Gas Chemical, Co., Ltd., Ageless S-100, a rectangular shape of 50×45 mm), and then the oxygen absorbing agent contained in the small bag is attached an secured to the inside of the gas barrier three way sealing package (180×250 mm) by the double coated tape. In the same manner as described in the Example 1, tests of storage, opening and withdrawal after storage were performed using the package in which the small bag oxygen absorbing member is attached.

Comparison 3

In the same manner as shown in Example 1, except for not using any oxygen absorbing member at all, boiled udon is packed in a gas barrier three way sealing package, and tests of storage, opening and withdrawal after storage of the udon package were performed. The results are shown in Table 1.

As apparent from the results shown in the Table 1, the quality of udon was somewhat maintained by the influence of the oxygen absorbing agent in all examples other than the comparison 3 in which no oxygen absorbing agent was used. However, in the comparison 1, rust was generated from iron contained in the oxygen absorbing agent composition and eluted from the side edge of the exposed oxygen absorbing layer. Thereby udon was contaminated. In comparison 2 wherein a conventional oxygen absorbing member in a small bag was used, when udon was released from the package, udon was caught by the oxygen absorbing member, the oxygen absorbing member fell off due to the force of the udon so caught, or other operational inconvenience arose.

From the results shown in the Table 1, the self adhesive strip type oxygen absorbing member according to the present invention can be judged to have outstanding quality maintenance effect and be easy to handle and practical when used.

TABLE 1

| Sample | | Oxygen Content after 10 days | Condition of udon after 10 days | Condition of release of udon |
|---|---|---|---|---|
| Example 1 | 1 | 0.01% or less | Good quality maintenance | Smoothly fell down |

TABLE 1-continued

| Sample | | Oxygen Content after 10 days | Condition of udon after 10 days | Condition of release of udon |
|---|---|---|---|---|
| | 2 | 0.01% or less | Good quality maintenance | Smoothly fell down |
| | 3 | 0.01% or less | Good quality maintenance | Smoothly fell down |
| Example 2 | 1 | 0.01% or less | Good quality maintenance | Smoothly fell down |
| | 2 | 0.01% or less | Good quality maintenance | Smoothly fell down |
| | 3 | 0.01% or less | Good quality maintenance | Smoothly fell down |
| Comparison 1 | 1 | 0.01% or less | Contaminated with rust | Smoothly fell down |
| | 2 | 0.01% or less | Contaminated with rust | Smoothly fell down |
| | 3 | 0.01 % or less | Contaminated with rust | Smoothly fell down |
| Comparison 2 | 1 | 0.01 % or less | Good quality maintenance | Caught by oxygen absorbing agent |
| | 2 | 0.01% or less | Good quality maintenance | oxygen absorbing agent fell down |
| | 3 | 0.01% or less | Few rust spotted | Caught by oxygen absorbing agent |
| Comparison 3 | 1 | 5.23% | Impossible to eat with much mold | Not tested |
| | 2 | 4.77% | Impossible to eat with much mold | Not tested |
| | 3 | 9.10% | Impossible to eat with much mold | Not tested |

EXAMPLE 3

The same high performance sheet shaped oxygen absorbing agent as used in the Example 1 was punched out in a circular shape in a size of 20 mmφ by a punch to prepare an oxygen absorbing layer.

A synthetic rubber elastomer-base adhesive agent was applied on the unwoven cloth surface of a base material consisting of an unwoven cloth (50 g/m$^2$)/PE (100 μm), and a separator layer consisting of silicon resin coated polyethylene film was layered on the adhesive agent surface of the base layer to obtain a base layer with a separator layer. A fluorine (Fluorocarbon)-based water and oil resisting agent (manufactured by Asahi Chemical Industry Co., Ltd., Asahi Guard AG-650) was applied on one surface of an HDPE (high density polyethylene) unwoven cloth (manufactured by Dupont, "TYVEK" to form a gas permeable layer, and it was punched out in a circular shape in a size of 30 mmφ.

Using materials so obtained, a circular self adhesive strip type oxygen absorbing member was manufactured by a sealing machine having a doughnut shaped heating plate (outer diameter: 30 mm, inner diameter: 28 mm). First of all, a base layer having a separator layer was placed on the sealing table in such manner that the separator layer faced the table. A circular-shaped oxygen absorbing layer (20 mmφ) and a gas permeable layer (30 mmφ) on the "TYVEK" surface were placed on the base layer in such manner that the center of the circle matched the center of the heating plate, and then the heating plate was pulled down and the HDPE unwoven cloth, which is a gas permeable layer, and an unwoven cloth on the base layer was heat sealed through PE layer, to obtain a circular self adhesive strip type oxygen absorbing agent (30 mmφ).

A glass jar (volume of approximately 170 cc) provided with a metallic lug cap as a cover (diameter: 65 mm) having polyvinyl chloride sealer was prepared, and the circular self adhesive strip type oxygen absorbing member was attached at the inner center portion of the lug cap after it was peeled off from the separator layer. The glass jar was filled with orange juice 150 cc, sealed with a lug cap having a self adhesive strip type oxygen absorbing member attached inside, and was stored for seven days at a temperature of 35° C.

After seven days' storage, the oxygen content of the head space of the glass jar containing the orange juice was measured by gas chromatography, and the color and taste of the orange juice was observed, after opening the glass jar. The results are shown in Table 2.

Comparison 4

The orange juice storage test was performed in the same manner as described in the Example 3, using the glass jar having a lug cap on which the oxygen absorbing member was not attached. The results are shown in Table 2.

TABLE 2

| Sample | Oxygen Content | Color of Orange Juice | Taste of Orange Juice |
|---|---|---|---|
| Example 3 | 0.01 % or less | Good color maintenance | Good taste maintenance |
| Comparison 4 | 6.25% | Significant deterioration | Weak taste with smell of mold |

EXAMPLE 4

A long size base layer with a separator layer (width: 40 mm, length: 500 mm) was prepared in the same manner and using the same material as described in Example 1. A long size gas permeable layer (width: 40 mm, length: 500 mm) was prepared in the same manner and using the same material as described in Example 3.

At the center in the width direction of the exposed adhesive surface of a long size base layer with a separator layer so prepared (width: 40 mm, length: 500 mm), twelve units of the same circular shaped oxygen absorbing layer as used in the Example 3 (20 mmφ) were attached by compression, with a distance of 40 mm between each other in its longitudinal direction, leaving 15 mm of adhesive surface on both ends. The above mentioned long size gas permeable layer was layered on the oxygen absorbing agent layer and the base layer matching the "TYVEK" surface, and was attached by compression so that the gas permeable layer and the base layer were completely attached at the area without the oxygen absorbing layer. An oxygen absorbing member was assembled by matching the center of a punch (30 mmφ) with the center of the circular oxygen absorbing layer, and punching the gas permeable layer and the base layer, leaving only the separator layer. Finally, the outside gas permeable layer and the base layer were removed from the lamination material so punched to halfway to the separator layer, to obtain a continuous member of a series of 12 self adhesive strip type oxygen absorbing members wherein a circular self adhesive type oxygen absorbing agent strip (30 mmφ) is placed on one sheet of silicon coated paper (width: 40 mm, length: 500 mm).

A continuous member of the self adhesive strip type oxygen absorbing member so obtained was wound on a paper tube having 1 cm thickness and 1 inch inner diameter, which was attached to a manual label sealing machine operated by manually rotating the rubber made supplying roller (manufactured by Kanebun, Use Touch 303W). Continuous sealing was performed without any difficulty.

EXAMPLE 5

The separator layer was peeled off from the self adhesive strip type oxygen absorbing member prepared in Example 1, and the oxygen absorbing member was secured to the inside of the three way sealing package bag comprising gas barrier film consisting of KON ($15\mu$)/PE($50\mu$).

The bag in which the self adhesive strip type oxygen absorbing member was attached was filled with 100 g of chicken nuggets, and the bag opening was heat sealed.

The chicken nuggets package was kept at the temperature of 10° C. and irradiated with 3000 lux fluorescent light.

Ten days later, the appearance of the chicken nuggets was observed and the oxygen content within the package was measured by gas chromatography.

Then, the chicken nuggets package was cooked by irradiation of microwave by a 500 W microwave oven (manufactured by Mitsubishi Electric Co., Ltd.) for 90 seconds. The appearance of the self adhesive strip type oxygen absorbing member was observed, and a sensory test of the chicken nuggets was performed. The results are shown in Table 3.

Comparison 5

The chicken nuggets were tested in the same manner as shown in the Example 5 except for securing a commercial small bag-shaped oxygen absorbing member (manufactured by Mitsubishi Gas Chemical, Co., Ltd. AGELESS S-100), instead of the self adhesive strip type oxygen absorbing member, by using pressure sensitive adhesive double coated tape as in Comparison 2. The results are shown in Table 3.

Comparison 6

The chicken nuggets are tested in the same manner as shown in the Example 5 except for not using any oxygen absorbing agent at all. The results are shown in Table 3.

TABLE 3

|  | Appearance of Chicken Nuggets after 10 days | Condition of Oxygen Absorbing Agent after Use of Microwave Oven | Results of Sensory Test after use of Microwave Oven |
| --- | --- | --- | --- |
| Example 5 | Normal | Normal | Good |
| Comparison 5 | Normal | Small bag was burned, and content was sprayed | Chicken nuggets were contaminated with the contents of the oxygen absorbing agent, and impossible to eat |
| Comparison 6 | Decolored (changed to whitish color) | — | Oxidized smell, significant deterioration of taste |

The self adhesive strip type oxygen absorbing member may be advantageously used for foodstuffs to be cooked in a microwave oven, without causing spark or destruction of a bag containing an oxygen absorbing agent when cooked in a microwave oven.

The sheet shaped oxygen absorbing member according to the present invention is a lamination wherein an oxygen absorbing layer comprising a sheet-shaped oxygen absorbing agent is not exposed to the atmosphere, and is a new type of self adhesive strip type one way oxygen absorbing member which can be attached and used by easily peeling off the separator layer.

In the present invention, the characteristics of a sheet shaped oxygen absorbing agent are used in a one way absorbing agent. The sheet shaped oxygen absorbing member has an outstanding oxygen absorbing property and can be manufactured at lower cost because the configuration of the material for lamination is reasonable.

Since the sheet shaped oxygen absorbing member has a smooth flat surface and is thin, it can be firmly secured when it is used, and gives no feeling of physical disorder and does not disturb the input or output of articles to be packed. Moreover, as opposed to the conventional oxygen absorbing agent contained in a small bag, the sheet shaped oxygen absorbing member can prevent possible dispersion of granular oxygen absorbing agent caused from destruction of a bag, or a possible elution of iron rust, and thus it has outstanding safety and sanitary properties. In particular, the sheet shaped oxygen absorbing member has outstanding resistance against microwaves, and thus can be used in a microwave oven. The form of the sheet shaped oxygen absorbing member according to the present invention may be suited for a form of a packaging container or a purpose of use. It is also possible to print a notice on the sheet shaped oxygen absorbing member so that the notice is visible from outside the container.

According to the present invention, the continuous manufacturing process of the sheet shaped oxygen absorbing member can be readily attained, which enables commercial production. According to the sheet shaped oxygen absorbing member according to the present invention, the entire process, from peeling off of the separator layer to the attachment of the member to a container can be mechanically performed by using various types of label attaching machines, either manual or automatic, and thus realizing labor saving for oxygen absorbing packaging operations.

Therefore, the sheet shaped oxygen absorbing member according to the present invention is a completely new type of oxygen absorbing agent having many features, which can be applied in the broad area.

EXAMPLE 6

A sheet shaped oxygen absorbing member is obtained by making grooves on the oval oxygen absorbing agent (size 52 mm×30 mm, thickness: 1 mm) manufactured in Example 1. The grooves are in the shape of a lattice (the distance between each groove being 4 mm) and are made parallel to the longer diameter and the shorter diameter of the oxygen absorbing agent. The thickness of the sheet shaped oxygen absorbing agent from the bottom of the groove to the opposite surface of the sheet shaped oxygen absorbing agent is 0.06 mm.

The sheet oxygen absorbing member obtained above (64 mm×40 mm, thickness: 2 mm) was attached to the inside surface of the tray, the portion immediately adjacent to the edge of the top film being unwound by using a thermal form/fill/seal packing machine (manufactured by Multivac, Inc.), and the packaging properness was examined. As a result, the sheet shaped oxygen absorbing member attached to the top film fairly followed the movement of the top film even on the turn roll of the packing machine, remaining attached to the film. In consequence, a tray container bearing the oxygen absorbing agent was obtained.

Comparison 7

The examination of a packaging properness was performed in the same manner as in Comparison 6 above, except that the same oxygen absorbing agent contained in small bags (Ageless S-100, manufactured by MITSUBISHI GAS CHEMICAL CO., INC.) as those described in Comparison 2 was used instead of the sheet shaped oxygen absorbing member and was fixed on the film by using an adhesive double coated tape. As a result, when the film with the oxygen absorbing agent attached thereon passed through the turn roll of the packing machine, the oxygen absorbing agent could not completely follow the movement of the film, the adhesive side fell off from the top film, and a tray container bearing the oxygen absorbing agent could not be manufactured.

Comparison 8

The examination of a packaging properness was performed in the same manner as in Comparison 6 above, except that no groove were cut into the sheet shaped oxygen absorbing agent. As a result, when the film with the oxygen absorbing agent attached thereon passed through the turn roll of the packing machine, the oxygen absorbing agent could not completely follow the movement of the film, the adhesive side fell off from the top film, and a tray container bearing the oxygen absorbing agent could not be manufactured.

EXAMPLE 7

An oval sheet shaped oxygen absorbing member (64 mm×40 mm; thickness: 2 mm) was manufactured in the same manner as in Example 1, except that a groove was cut into the oxygen absorbing agent in a lattice (the distance between each groove being 4 mm), at an angle 45° against the lengthwise direction of the sheet shaped oxygen absorbing agent. Subsequently, by using a horizontal form/fill/seal packing machine (manufactured by Japan Polystar, Inc.; pillow package size: 10 mm×120 mm), this sheet shaped oxygen absorbing member was attached to a film (width of the film:260 mm) by adjusting the longitudinal direction axis of the sheet shaped oxygen absorbing member to the moving direction of the film, so that the oxygen absorbing agent would be placed on one side of the back paste portion of the pillow and the center of the oxygen absorbing agent would be located at a position 50 cm ahead of the former of the packing machine, at a position 40 mm from the edge of the film, and thereafter, the packaging properness was examined. As a result, the sheet shaped oxygen absorbing member fairly followed the movement of the film even when the moving direction of the film changed, and a pillow package member with the sheet shaped oxygen absorbing member pasted thereon at a predetermined position (adjacent to the back paste portion of the pillow package) was obtained.

Comparison 9

The examination of a packaging properness was performed in the same manner as in Comparison 7 above, except that the same oxygen absorbing agent contained in small bags as those described in Comparison 2 (Ageless S-100, manufactured by MITSUBISHI GAS CHEMICAL CO., INC.) was used instead of the sheet shaped oxygen absorbing member and was pasted to a film by using a pressure sensitive adhesive double coated tape (10 mm×25 mm). As a result, the sheet shaped oxygen absorbing member came off when the moving direction of the film changed on the former. In consequence, a pillow package member with the sheet shaped oxygen absorbing member pasted thereon was not obtained.

Comparison 10

The examination of packaging properness was performed in the same manner as in Comparison 9 above, except that an adhesive double coated tape was attached to the entire surface (50 mm×25 mm) of one side of the oxygen absorbing agent contained in a small bag (Ageless S-100 manufactured by MITSUBISHI GAS CHEMICAL Co., INC.). As a result, the sheet shaped oxygen absorbing member did not come off when the moving direction of the film changed on the former. However, the film was strained due to the stiffness of the sheet shaped oxygen absorbing member, and proceeded in a zig-zag line, and the sheet shaped oxygen absorbing member bit into the back paste portion, thereby the sealing was not conducted completely. In consequence, a pillow member with the sheet shaped oxygen absorbing member attached thereon in a predetermined size was not obtained.

Comparison 11

The examination of a packaging properness was performed in the same manner as in Comparison 7 above, except that a sheet shaped oxygen absorbing member without cutting any groove into its sheet shaped oxygen absorbing agent was used. As a result, the sheet shaped oxygen absorbing member did not come off when the moving direction of the film changed on the former. However, the film was strained due to the stiffness of the sheet shaped oxygen absorbing member, and proceeded in a zig-zag line. In consequence, a pillow package member of a normal form was not obtained.

As shown above, since the sheet shaped oxygen absorbing member of the present invention abounds in flexibility, it never comes off when it is pasted to a desired film by using various packing equipment. Moreover, the sheet shaped oxygen absorbing member does not proceed in a zig-zag line, and the handling of the agent is facilitated.

What is claimed is:

1. A sheet shaped oxygen absorbing member having an oxygen absorbing property and attachable to a packaging member, the sheet shaped oxygen absorbing member comprising:
    a separator layer;
    a base layer laminated on said separator layer;
    an oxygen absorbing layer on said base layer and having a periphery; and
    a gas permeable layer on said oxygen absorbing layer wherein said oxygen absorbing layer comprises a sheet shaped oxygen absorbing agent with a groove cut from at least one surface of said sheet shaped oxygen absorbing agent toward an opposite surface of said sheet shaped oxygen absorbing agent, and said gas permeable layer is directly attached to said base layer at the periphery of said oxygen absorbing layer.

2. The sheet shaped oxygen absorbing member according to claim 1, wherein the groove has a total length over a surface of said sheet shaped oxygen absorbing agent of 0.02–10 mm/mm$^2$ as regards projected area of said sheet shaped oxygen absorbing agent.

3. The sheet shaped oxygen absorbing member according to claim 1, wherein the groove has a depth so that said sheet shaped oxygen absorbing agent has a thickness of at least 0.01–0.5 mm from a bottom of the groove to a surface of said sheet shaped oxygen absorbing agent.

4. The sheet shaped oxygen absorbing member according to claim 1 wherein:
    said oxygen absorbing layer is derived from an iron-based oxygen absorbing composition dispersed into thermoplastic fibers, thermally formed into a sheet shape, and having an oxygen velocity of at least 100 ml/m$^2$·Hr at a temperature of 25°;

said gas permeable layer has an oxygen permeability of at least 10,000 cc/m$^2$·24 Hr·atm, and directly covers a first surface and side surfaces of said oxygen absorbing layer; and said base layer supports a second surface of said oxygen absorbing layer opposite a first surface of said oxygen absorbing layer, and said gas permeable layer, said base layer having, on a surface opposite a surface supporting said second surface of said oxygen absorbing layers an adhesive layer for attaching said oxygen absorbing layer and said gas permeable layer to a packaging member.

5. The sheet shaped oxygen absorbing member according to claim 4, further comprising a separator layer to which said base layer is attached, said adhesive layer being disposed between said separator layer and said base layer, wherein the base layer may be peeled from said separator layer for attachment to a packaging member by said adhesive layer.

6. The sheet shaped oxygen absorbing member according to claim 5, wherein said oxygen absorbing layer, said gas permeable layer, and said base layer comprise a self adhesive strip.

7. The sheet shaped oxygen absorbing member according to claim 6, wherein said separator layer has a belt shape, and a plurality of said self adhesive strips is continuously attached to the separator layer.

8. The sheet shaped oxygen absorbing member according to claim wherein said iron-based based oxygen absorbing composition comprises an iron-based oxygen absorbing agent and a resin.

9. The sheet shaped oxygen absorbing member according to claim 8, wherein said iron-based oxygen absorbing composition comprises iron powder and a metal halide.

10. The sheet shaped oxygen absorbing member according to claim 8, wherein said resin is a thermoplastic polyolefin-based resin.

11. The sheet shaped oxygen absorbing member according to claim 4, wherein, after being processed into a sheet, said composition is formed into said sheet shape by drawing said sheet in at least a direction of one axis to 1.5 to 10 times the original size.

12. The sheet shaped oxygen absorbing member according to claim 11, wherein, after drawing, said sheet shape oxygen absorbing layer has micropores.

13. The sheet shaped oxygen absorbing member according to claim 5, wherein said base layer further comprises a base material having shape stability.

14. The sheet shaped oxygen absorbing member according to claim 13, wherein printed matter appears on a surface of said base layer facing said separator layer.

15. The sheet shaped oxygen absorbing member according to claim 5, wherein said separator layer comprises at least one of a paper to which a release agent has been applied, a resin film, and a metallic foil.

16. The sheet shaped oxygen absorbing member according to claim 5, wherein the sheet shaped oxygen absorbing member has a thickness ranging from 0.1 to 5 mm.

17. The sheet shaped oxygen absorbing member according to claim 4, wherein a sheet containing water is layered on said oxygen absorbing layer.

18. The sheet shaped oxygen absorbing member according to claim 4, wherein said gas permeable layer has an oxygen permeability of at least 30,000 cc/m$^2$·24 Hr·atm.

19. The sheet shaped oxygen absorbing member according to claim 13, wherein said adhesive layer comprises a first adhesive layer and a second adhesive layer, said first adhesive layer attaching the oxygen absorbing layer and the gas permeable layer to the base material, and said second adhesive layer for attaching said base material to said separator layer and to a packaging member.

20. The sheet shaped oxygen absorbing member according to claim 4, wherein said gas permeable layer has an oxygen permeability of 50,000 cc/m$^2$·24 Hr·atm.

* * * * *